United States Patent
Xia

(10) Patent No.: US 12,251,879 B2
(45) Date of Patent: Mar. 18, 2025

(54) METHODS OF CONTROLLING DIMENSIONS IN PROJECTION MICRO STEREOLITHOGRAPHY

(71) Applicant: BMF Precision Technology (Wuxi) Inc., Wuxi (CN)

(72) Inventor: Chunguang Xia, San Diego, CA (US)

(73) Assignee: BMF Nano Material Technology Co., Ltd., Shenzhen (CN)

(*) Notice: Subject to any disclaimer, the term of this patent is extended or adjusted under 35 U.S.C. 154(b) by 279 days.

(21) Appl. No.: 17/312,173

(22) PCT Filed: Nov. 6, 2019

(86) PCT No.: PCT/IB2019/001214
§ 371 (c)(1),
(2) Date: Jun. 9, 2021

(87) PCT Pub. No.: WO2020/121052
PCT Pub. Date: Jun. 18, 2020

(65) Prior Publication Data
US 2022/0048254 A1     Feb. 17, 2022

Related U.S. Application Data

(60) Provisional application No. 62/777,353, filed on Dec. 10, 2018.

(51) Int. Cl.
*B29C 64/393* (2017.01)
*B29C 64/124* (2017.01)
(Continued)

(52) U.S. Cl.
CPC .......... *B29C 64/393* (2017.08); *B29C 64/124* (2017.08); *B29C 64/40* (2017.08);
(Continued)

(58) Field of Classification Search
CPC ............... B29C 64/106; B29C 64/393; B29C 64/10–135; B29C 64/124
See application file for complete search history.

(56) References Cited

U.S. PATENT DOCUMENTS 4,575,330 A   3/1986   Hull
5,192,559 A   3/1993   Hull
(Continued)

FOREIGN PATENT DOCUMENTS

CN   102928910   2/2013
CN   104827667   8/2015
(Continued)

OTHER PUBLICATIONS

English translation of JP-07329188-A by EPO. (Year: 1995).*
(Continued)

*Primary Examiner* — Timothy Kennedy
*Assistant Examiner* — Inja Song
(74) *Attorney, Agent, or Firm* — Young Basile Hanlon & MacFarlane, P.C.

(57) ABSTRACT

Parallel surfaces on two substrates are established with specific distances of separation, typically within a 10-micron tolerance. In general, one surface is a surface of a transparent membrane or hard window. On one embodiment, the gap defined by the distance of the transparent membrane or hard window and the other surface used to precisely control the dimensions of layers in projection micro stereolithography, however the methods for establishing the relative positions of two surfaces can be adapted to other applications.

10 Claims, 3 Drawing Sheets

Step 1

Step 2

Step 3

(51) Int. Cl.
  *B29C 64/40* (2017.01)
  *B33Y 10/00* (2015.01)
  *B33Y 40/20* (2020.01)
  *B33Y 50/02* (2015.01)
  *B33Y 70/00* (2020.01)
  *B29K 33/00* (2006.01)
  *B29K 71/00* (2006.01)

(52) U.S. Cl.
  CPC .............. *B33Y 10/00* (2014.12); *B33Y 40/20* (2020.01); *B33Y 50/02* (2014.12); *B33Y 70/00* (2014.12); *B29K 2033/26* (2013.01); *B29K 2071/02* (2013.01)

(56) References Cited

U.S. PATENT DOCUMENTS

| | | | |
|---|---|---|---|
| 5,933,278 A | 8/1999 | Plummer | |
| 6,011,577 A | 1/2000 | Goodman | |
| 6,607,689 B1* | 8/2003 | Farnworth | B33Y 40/20 425/375 |
| 7,892,474 B2 | 2/2011 | Shkolnik | |
| 8,487,822 B1 | 7/2013 | Jennings | |
| 9,205,601 B2 | 12/2015 | Desimone | |
| 9,211,678 B2 | 12/2015 | Desimone | |
| 9,216,546 B2 | 12/2015 | Desimone | |
| 9,360,757 B2 | 6/2016 | Desimone | |
| 9,496,675 B1 | 11/2016 | Plummer | |
| 11,654,617 B2 | 5/2023 | Xia et al. | |
| 11,654,619 B2 | 5/2023 | Xia | |
| 2005/0219400 A1* | 10/2005 | Poulsen | H04N 17/002 348/E17.002 |
| 2005/0248061 A1* | 11/2005 | Shkolnik | B29C 64/135 264/401 |
| 2008/0174050 A1 | 7/2008 | Kikuchi | |
| 2009/0186306 A1* | 7/2009 | Haraldsson | B29C 64/135 430/322 |
| 2009/0196946 A1* | 8/2009 | Kihara | B29C 64/135 425/171 |
| 2010/0291401 A1 | 11/2010 | Medina | |
| 2011/0101569 A1 | 5/2011 | Yasukochi | |
| 2011/0260365 A1 | 10/2011 | El-Siblani | |
| 2011/0285060 A1 | 11/2011 | Yamamoto et al. | |
| 2013/0021217 A1 | 1/2013 | Tsai | |
| 2013/0295212 A1 | 11/2013 | Chen | |
| 2015/0001763 A1 | 1/2015 | Elsey | |
| 2015/0247679 A1 | 9/2015 | Niimi | |
| 2017/0274586 A1 | 9/2017 | Hakkaku | |
| 2017/0334142 A1 | 11/2017 | Baldeck | |
| 2017/0355132 A1 | 12/2017 | Moore | |
| 2018/0056587 A1 | 3/2018 | Arai | |
| 2018/0056590 A1 | 3/2018 | Costabeber | |
| 2018/0194064 A1* | 7/2018 | Chen | B33Y 50/02 |
| 2018/0200964 A1 | 7/2018 | Rockstroh | |
| 2019/0022947 A1* | 1/2019 | Ho | B33Y 50/02 |
| 2019/0111622 A1* | 4/2019 | Khalip | B29C 64/268 |
| 2020/0061917 A1 | 2/2020 | Osborn et al. | |
| 2020/0063093 A1 | 2/2020 | Matheu et al. | |
| 2020/0101665 A1 | 4/2020 | Beets | |
| 2020/0108465 A1 | 4/2020 | Sweetland | |
| 2021/0237345 A1 | 8/2021 | Xia et al. | |
| 2021/0276249 A1 | 9/2021 | Xia | |
| 2021/0331380 A1 | 10/2021 | Seo | |
| 2023/0045800 A1 | 2/2023 | Xia | |
| 2023/0398739 A1 | 12/2023 | Xia et al. | |
| 2024/0157642 A1 | 5/2024 | Korten et al. | |
| 2024/0198587 A1 | 6/2024 | Xia | |

FOREIGN PATENT DOCUMENTS

| | | | |
|---|---|---|---|
| CN | 104991353 | 10/2015 | |
| CN | 105390056 | 3/2016 | |
| CN | 206718470 | 12/2017 | |
| CN | 107756814 | 3/2018 | |
| CN | 107756814 A | 3/2018 | |
| CN | 108437448 | 8/2018 | |
| CN | 108437448 A | 8/2018 | |
| CN | 109466061 | 3/2019 | |
| CN | 109483872 | 3/2019 | |
| CN | 109483872 A | 3/2019 | |
| CN | 111873431 | 11/2020 | |
| CN | 111873433 | 11/2020 | |
| CN | 112549537 | 3/2021 | |
| CN | 113927897 | 1/2022 | |
| EP | 1732746 B1 | 4/2011 | |
| EP | 3107703 B1 | 4/2020 | |
| EP | 4232262 A1 | 8/2023 | |
| EP | 3894184 B1 | 1/2024 | |
| EP | 4326529 A1 | 2/2024 | |
| EP | 4384379 A1 | 6/2024 | |
| JP | 07329188 A * | 12/1995 | ........... B29C 64/135 |
| JP | 2004314406 | 11/2004 | |
| JP | 2005219400 A * | 8/2005 | ......... G03F 7/70416 |
| JP | 2009083240 | 4/2009 | |
| JP | 2009083240 A * | 4/2009 | |
| TW | 1568571 B * | 2/2017 | |
| WO | 2008069564 | 6/2008 | |
| WO | 2009042671 | 4/2009 | |
| WO | 2012051598 | 4/2012 | |
| WO | 2014042486 | 3/2014 | |
| WO | 2016115095 | 7/2016 | |
| WO | 2017157851 | 9/2017 | |
| WO | 2019014098 A1 | 1/2019 | |
| WO | 2020181620 | 9/2020 | |
| WO | 2021056720 | 4/2021 | |
| WO | 2021103502 | 6/2021 | |
| WO | 2021165878 A1 | 8/2021 | |

OTHER PUBLICATIONS

English translation of JP-2005219400-A by EPO. (Year: 2005).*
English translation of JP-2009083240-A by EPO. (Year: 2009).*
Panasonic ("Micro Laser Distance Sensor," in public at least in Apr. 2014, available at https://www.farnell.com/datasheets/1863584.pdf). (Year: 2014).*
English translation of TW-I568571-B by USPTO Search. (Year: 2017).*
"Three-dimensional fabrication of heterogeneous microstructures using soft membrane deformation and optofluidic maskless lithography", Seung Ah Lee, Su Eun Chung, Wook Park, Sung Hoon Lee and Sunghoon Kwon, Lab Chip, 2009, 9, 1670-1675.
Arnaud Bertsch, Sébastien Jiguet, Paul Bernhard and Philippe Renaud, "Microstereolithography: a Review," Materials research society symposium proceedings, vol. 758, 2003, p. 3-15.
B. J. Lei, et al., "A wideband, pressure-driven, liquid-tunable frequency selective surface," IEEE Microwave Wireless Components Letters, vol. 21, No. 9, pp. 465-467, 2011.
Beluze et al., "Microstereolithography: a new process to build complex 3D objects, Symposium on Design, Test and microfabrication of MEMs/MOEMSs", Proceedings of SPIE, v3680, n2, p808-817, 1999.
Bertsch et al., "Microstereophotolithography using a liquid crystal display as dynamic mask-generator", Microsystem Technologies, p. 42-47, 1997.
Han et al., "Rapid multi-material 3D printing with projection micro-stereolithography using dynamic fluidic control," Additive Manufacturing 27(11):606-615, 2019.
Jingi Wang et al., "Liquid metal-based plasmonics" Optics Express, vol. 20, No. 2, p. 2346-2353, Jan. 2012.
K. Ikuta and K. Hirowatari, "Real three dimensional micro fabrication using stereo lithography and metal molding," 6th IEEE Workshop on Micro Electrical Mechanical Systems, 1993.
Kowsari, et al., "High-efficiency high-resolution multimaterial fabrication for digital light processing-based three-dimensional printing," 3D Printing and Additive Manufacturing 5(3):185-193, 2018.
S. Kawata, H. B. Sun, T. Tanaka and K. Takada, "Finer features for functional microdevices," Nature, vol. 412, pp. 697, 2001.
S. Maruo and K. Ikuta, "Movable microstructures made by two-photon three-dimensional microfabrication," in Proceedings of 1999 International Symposium on Micromechatronics and Human Science, 1999, pp. 173-178.

(56) References Cited

OTHER PUBLICATIONS

S. Maruo and K. Ikuta, "Three-dimensional microfabrication by use of single-photon-absorbed polymerization," Appl. Phys. Lett., vol. 76, 2000.

S. Maruo and S. Kawata, "Two-Photon-Absorbed Near-Infrared Photopolymerization for Three dimensional Microfabrication," J. MEMS, vol. 7, pp. 411, 1998.

S. Maruo, O. Nakamura and S. Kawata, "Three-dimensional microfabrication with two-photon-absorbed photopolymerization," Optics Letters, vol. 22, pp. 132, 1997.

T. Takagi and N. Nakajima, 4th International Symposium on Micro Machine and Human Science, 1993.

International Search Report and Written Opinion for PCT Patent Application No. PCT/IB2023/051584, 10 pages.

International Search Report and Written Opinion for PCT Patent Application No. PCT/IB2021/059731 dated Feb. 28, 2022.

International Search Report and Written Opinion for PCT Patent Application No. PCT/IB2022/053395 dated Jun. 27, 2022, 12 pages.

International Search Report and Written Opinion for PCT Patent Application No. PCT/IB2021/059731 dated Feb. 28, 2022, 22 pages.

International Search Report and Written Opinion for PCT Patent Application No. PCT/IB2022/057569 dated Nov. 8, 2022, 16 pages.

Non-Final Office Action for U.S. Appl. No. 18/033,405 dated Jan. 3, 2025.

Non-Final Office Action for U.S. Appl. No. 17/887,337 dated Sep. 16, 2024.

* cited by examiner

METHODS OF CONTROLLING DIMENSIONS IN PROJECTION MICRO STEREOLITHOGRAPHY

The present invention provides improved methods for controlling the position of surfaces relative to each other, for example, establishing parallel surfaces, typically within a 10-micron tolerance, which methods can precisely control the dimensions in 3D printing technologies, e.g., projection micro stereolithography, in particular, controlling the dimension accuracy in the printing direction. The methods invented here are not limited to this 3D printing method, it is also valid for any other type of methods using a transparent window or membrane.

BACKGROUND

Stereolithography was originally conceived as a rapid prototyping technology. Rapid prototyping refers to a family of technologies that are used to create true-scale models of production components directly from computer aided design (CAD) at a faster rate. Since its disclosure in U.S. Pat. No. 4,575,330, stereolithography has greatly aided engineers in visualizing complex three-dimensional part geometries, detecting errors in prototype schematics, testing critical components, and verifying theoretical designs at relatively low costs and in a faster time frame than before.

During the past decades, continuous investments in the field of micro-electro-mechanical systems (MEMS) have led to the emergence of micro-stereolithography (µSL), which is based on the basic principles from traditional stereolithography but with much higher spatial resolution e.g., K. Ikuta and K. Hirowatari, "Real three dimensional micro fabrication using stereo lithography and metal molding," 6th IEEE Workshop on Micro Electrical Mechanical Systems, 1993. Aided by single-photon polymerization and two-photon polymerization techniques, the resolution of µSL was further enhanced to be less than 200 nm, e.g., S. Maruo and K. Ikuta, "Three-dimensional microfabrication by use of single-photon-absorbed polymerization," Appl. Phys. Lett., vol. 76, 2000; S. Maruo and S. Kawata, "Two-Photon-Absorbed Near-Infrared Photopolymerization for Three-dimensional Microfabrication," J. MEMS, vol. 7, pp. 411, 1998; and S. Kawata, H. B. Sun, T. Tanaka and K. Takada, "Finer features for functional microdevices," Nature, vol. 412, pp. 697, 2001.

The speed was dramatically increased with the invention of projection micro-stereolithography (PµSL), Bertsch et al., "Microstereophotolithography using a liquid crystal display as dynamic mask-generator", Microsystem Technologies, p42-47, 1997; and Beluze et al., "Microstereolithography: a new process to build complex 3D objects, Symposium on Design, Test and microfabrication of MEMs/MOEMs", Proceedings of SPIE, v3680, n2, p808-817, 1999. The core of this technology is a high resolution spatial light modulator, which is typically either a liquid crystal display (LCD) panel or a digital light processing (DLP) panel, each of which are available from micro-display industries.

3D printing requires high levels of in-plane and off-plane resolution. In the image focus plane of PµSL, the in-plane resolution is determined by both the physical pixel size of the micro display chip and the light engine optics. Almost all 3D printers based on DLP currently on the market have an in-plane resolution of 50-100 microns. The off-plane resolution (layer thickness) depends on the mechanical architecture, such as the motor stage, and is typically within tenths of microns.

As dimensional accuracy approaches a few microns, in-plane resolution can be achieved with good optical lenses, DLP/LCD pixel size is already less than 10 microns, and off-plane accuracy is supported by the higher resolution motorized stages. However, accurately controlling the thickness of the first few layers of printed samples remains a big challenge, and as a result, the dimensional accuracy in the printing direction is rarely smaller than 10 microns, typically around 100 microns. This is due, in large part, to the accuracy of mechanical machining and assembly which typically exceeds 10 microns.

There are three types of resin layer definition methods in PµSL. One uses a free surface where the layer thickness is defined by the distance between the resin free surface and the sample stage. Control over the first layer depends on the precise positioning of the resin surface and stage. Current technology uses monitoring focused through a printing lens and moving both surfaces to the focus plane of the same lens. However, the focus depth of the lens is at an order of 100 microns or more, hence the error of the thickness of the first layer can be 100 microns or more. The second and the third methods use either a transparent membrane or a hard window. For both cases, there is currently no good method for positioning the membrane or the window relative to the sample stage with an error of less than 10 microns, especially for the membrane case as the push-against-the-membrane is no longer an option.

While PµSL technology has been successful in delivering fast fabrication speeds with good resolution, further improvements are still wanted. In many technologies, accuracy in the alignment and size of multiple layers is very important. For example, in PµSL systems (FIG. 1), it is very important to have high accuracy and uniformity in layer thickness and orientation for all layers so that printed samples can precisely represent the actual CAD model.

SUMMARY OF THE INVENTION

The present invention provides methods to more precisely control the position of surfaces relative to each other, for example, parallel surfaces, typically within a 10-micron tolerance. In one embodiment, the present methods accurately establish the parallel relationship of surfaces on two substrates at a well-defined distance from each other. In some embodiments, it is preferred that one substrate is transparent, e.g., optically transparent. The methods can greatly improve the dimensional accuracy of samples printed using, e.g., PµSL systems, but have use in many other applications where the alignment of surfaces is important, in particular, where one or more surface is part of a transparent substrate.

In one embodiment of the invention, a displacement sensor is used to aid in both aligning surfaces of two or more substrates relative to each other, e.g., aligning a surface on one substrate to be parallel to a surface on another substrate, and accurately establishing the space or distance between the two or more substrates, in particular, the distance between the two surfaces. In another embodiment, a sacrificial resin is used to make a surface precisely parallel to a second substrate, which sacrificial substrate can be readily removed by the action of an etching solution.

For example, in many embodiments, the invention makes use of a system comprising i) a lens having an optical axis, ii) a charge-coupled device (CCD), capable of performing or assisting in performing an auto focusing program, and iii) a displacement sensor having an emission vector. The system is arranged relative to a surface of a substrate so that the lens is situated between the surface of the substrate and the CCD, the optical axis of the lens intersects the surface, the CCD is focusable through the lens along the optical axis, and the emission vector of the displacement sensor is parallel to the optical axis.

A plane can be defined by three points that do not reside on the same line, i.e., three points defining an angle that is other than 0 or 180 degrees. Based on this, a level first surface is established by selecting three non-linear points on the surface of a first substrate, sequentially aligning each of the points with the emission vector of the displacement sensor, measuring the distance between the displacement sensor and each of the three selected non-linear points, and adjusting the substrate so that the distance between the displacement sensor and each of the selected points is the same see FIG. 2.

A second substrate is placed between the level first surface and the displacement sensor, three non-linear points are selected on the surface of the second substrate facing the lens and displacement sensor, and the process of adjusting the substrate so that the distance between the displacement sensor and each of the selected points is the same is repeated, providing two parallel surfaces.

More than three points on either surface may be selected and the distance to the displacement center measured, but only three points are needed. Having a minimum distance between the selected points of at least 1 cm provides excellent accuracy.

The same system comprising the lens, CCD and displacement sensor above is also used to precisely define the distance between a surface of a first substrate and a surface of a second substrate, as shown in FIG. 3. Typically, the system runs an auto focus protocol using the CCD to place the first surface at the focus plane, the laser displacement sensor then reads the position of the surface of the first substrate, the second substrate is placed in position and the laser displacement sensor is used to help position the second substrate at a desired distance from the surface of the first substrate.

Best results are achieved when using a highly accurate displacement sensor, e.g., a laser displacement sensor or other type of displacement sensor accurate to within less that 10-micron. Such sensors are commercially available, for example, laser displacement sensors from Keyence detect displacements of 10 microns or less.

In one embodiment, all the steps are run in the order listed above, but in other embodiments, steps can be repeated or run out of the listed sequence. For example, all or a part of the steps related to establishing parallel surfaces can be repeated as desired and may be interspersed with steps establishing the distance between the surface of a first substrate.

In other embodiments, a sacrificial resin is used to make a surface precisely parallel and tangential to a second substrate, e.g., such as when providing a 3D printing sample stage surface parallel and tangential to membrane or hard window. (FIG. 4). For example, in one embodiment, a sample stage, useful for 3D printing, is prepared by providing a curable resin to fill a gap between a sample stage and a level substrate, e.g., a membrane or hard window. The resin is cured, by light, heat or other means, to yield a surface of sacrificial polymer, parallel to the level substrate and at a known distance. Upon printing, the sacrificial resin is removed by the action of an etching solution.

DETAILED DESCRIPTION OF THE INVENTION

In one embodiment of the invention, the method is aided by a displacement sensor, e.g., as part of the lens/CCD/displacement system discussed above. Typically, the displacement sensor is a laser displacement sensor, but any other type of displacement sensor accurate to within 10-microns or less can be used. Such displacement sensors are commercially available, for example, laser displacement sensors from Keyence detect a displacement of 10 microns or less.

Figure 2:
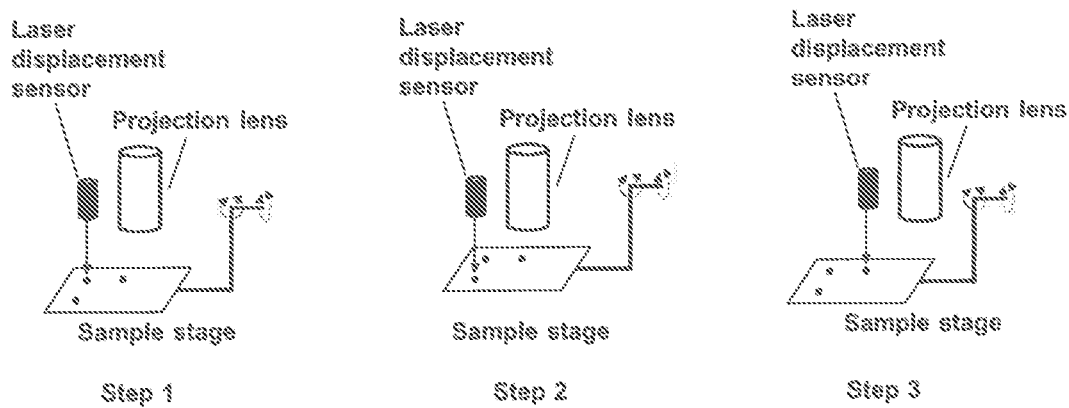
FIG. 2 shows the steps used in leveling a sample stage using a laser displacement sensor in the PµSL system.

The displacement sensor serves two purposes. One is to align one surface parallel to another. For example, the methods herein can be used as part of PµSL printing process to establish a resin free surface, membrane or hard window as parallel to the surface of a sample stage. As shown in FIG. 2 for a PµSL printing system, three non-linear points, here forming the right-angle triangle shown, are selected on the sample stage surface and sequentially aligned with the displacement sensor emission vector by moving the x-y stages. Having a minimum distance between the points of 1 cm should guarantee good accuracy. The sample stage should be adjusted to make sure the distance readings between the displacement sensor and each point are the same. As the emission vector of the displacement sensor is parallel to the optical axis of the lens, proper controls of the system will provide a stage surface perpendicular to the emission vector of the displacement sensor, and the optical axis of the lens.

A membrane or hard window is then placed between the displacement sensor and the sample stage and the process above is repeated using three selected points on the surface of the membrane or the hard window to level the membrane. Again, proper control of the system readily provides a surface perpendicular to the optical axis ensuring that the two surfaces are parallel.

The second purpose of the laser displacement sensor is to precisely define the distance between the substrates or surfaces. In the case of 3D printing, e.g., in the PµSL system of FIG. 3, the distance between the surface of the sample stage and the membrane or the hard window will determine the thickness of the first layer as in the PµSL system as shown.

Figure 3:
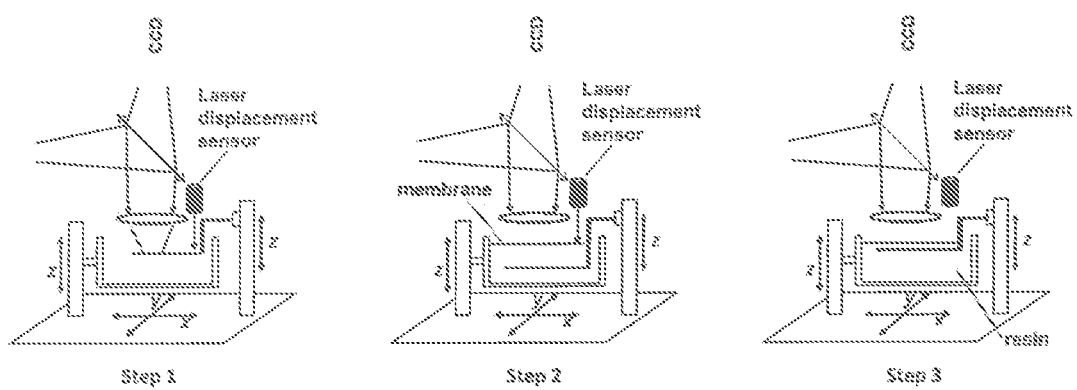
FIG. 3 shows operations for precisely defining the thickness of the first layer in a PµSL system.

To define the distance between the substrates or surfaces, the system runs the auto focus program using the CCD, see FIG. 3, to place the sample stage at the focus plane. The laser displacement sensor then reads the position of the surface of the sample stage. The second substrate, e.g., the membrane or hard window, is then placed in position and the laser displacement sensor will help to move the membrane or the hard window to the desired distance. In the case of 3D printing the distance between the sample stage and the membrane or hard window will equal the thickness of the first layer delivered to the sample stage. Control of the distance between the two layers can be no more accurate than the error of the displacement sensor and an accurate laser displacement sensor, e.g., accurate to within 10 microns or less, is preferred.

In the process as described above, two surfaces perpendicular to the optical axis are formed, which arrangement is ideal for 3D printing. The substrate bearing the surface of interest can be moved to sequentially bring the three points in line with a stationary displacement sensor. This can be done, for example, for the surface of a sample stage in a printing system, such as those shown in the present drawings, by moving the surface in the x-y directions.

In some embodiments, the displacement sensor may be moved to various locations aligned with the selected points to take the measurements. Under these circumstances, the surfaces will be parallel if the sensor locations for measurements on the first surface lie in a first common plane and the locations for measurements on the second surface lie either in the first common plane or in a second common plane parallel to the first.

One may also envision using the present lens/CCD/displacement system to establish parallel surfaces that are not perpendicular to the optical axis.

In particular embodiments, the invention provides a method for positioning a first surface of a first substrate, e.g., a sample stage for a stereolithography (3D printing) device, relative to a surface of a second substrate, e.g., a transparent substrate such as a membrane or hard window, wherein the second substrate is transparent, which method comprises:
 a) positioning a first substrate and a system comprising i) a lens having an optical axis, ii) a charge-coupled device (CCD) capable of performing or assisting in performing an auto focusing program, and a displacement sensor having an emission vector, in a manner such that the lens is situated between a surface of the first substrate and the CCD, the optical axis of the lens intersects the surface of the first substrate, the displacement sensor has an emission vector parallel to the optical axis, and the CCD is focusable through the lens along the optical axis,
 b) sequentially aligning three non-linear points on the surface of the first substrate with the emission vector of the displacement sensor, measuring the distance between the displacement sensor and the surface at each selected point, adjusting the substrate so that the distances between the displacement sensor and each of the three points are the same,
 c) placing the second substrate between the first substrate and the displacement sensor, sequentially aligning three non-linear points on a surface of the second substrate with the emission vector of the displacement sensor, measuring the distance between the displacement sensor and the surface at each selected point, adjusting the substrate so that the distances between the displacement sensor and each of the three points are the same to generate parallel surfaces.

The following method of the invention for establishing the distance between two surfaces may be incorporated into the above method in any order where appropriate:
 aa) performing an auto focusing program using the CCD so that the surface of the first substrate is at the focus plane of the lens followed by reading the position of the first surface with the displacement sensor,
 ab) placing the second substrate between the lens and the first substrate so that a surface is intersected by the optical axis of the lens and positioning the second substrate so that the surface of the second substrate is at a selected distance from the surface of the first substrate as measured by the displacement sensor.

Figure 1:
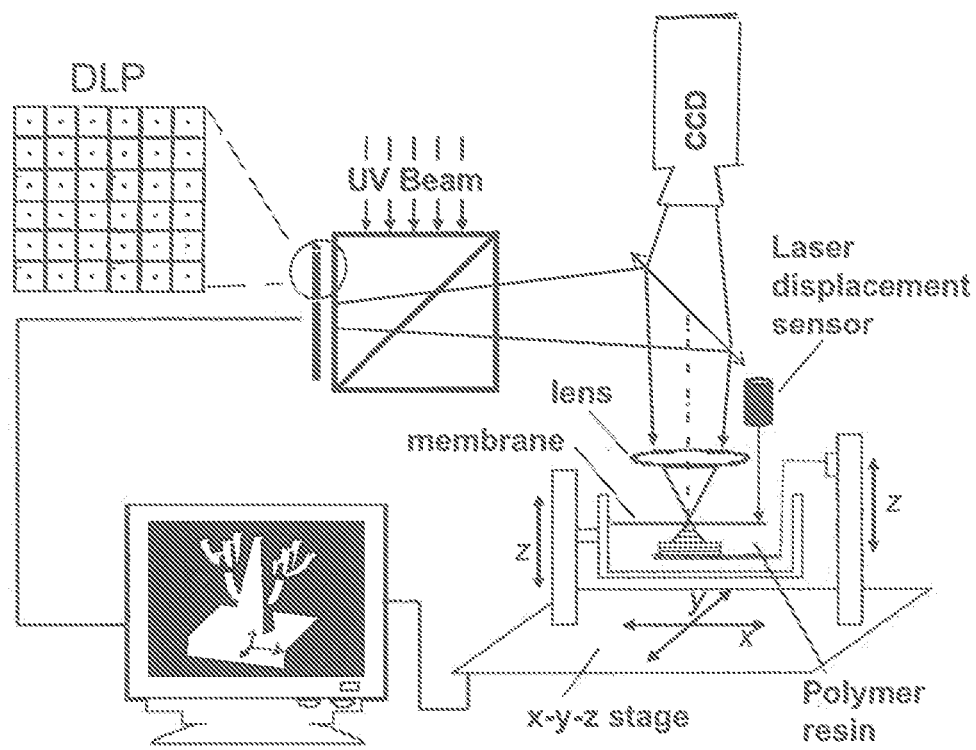
FIG. 1 is a schematic drawing of a projection micro stereolithography system with laser displacement sensor.

When the method is part of a printing process, the gap between the substrates typically define the thickness of, e.g., the first printing layer. For example, if part of a printing system of FIG. 1, the next steps in the above process could be to fill the resin tank to the appropriate level and begin printing.

In one embodiment, the first substrate is a sample stage for a 3D printing device and the second substrate is transparent, such as a transparent membrane or hard window.

In some embodiments the CCD is a laser CCD, e.g., a laser CCD camera.

In some embodiments the displacement sensor is a laser displacement sensor, typically with 10 micron accuracy. Generally, the lens is a projection lens.

In an embodiment the distance between the first and second layer is controlled within a tolerance of 20-microns or less, e.g., the distance between the first and second layer is controlled within a tolerance of 10-microns or less.

In many embodiments, the distance between the first substrate and the second substrate is equal to the thickness or a first layer of a 3D printing process.

In many embodiments the first substrate is a sample stage for 3D printing and the second substrate comprises a membrane or hard window, e.g., a membrane. Often the sample stage and membrane or hard window are positioned in a resin tank, and in such embodiments the method typically further comprises a step wherein after the first and second layers are positioned relative to each other the resin tank is filled with a curable resin to the level of the membrane or hard window.

An alternate embodiment of the invention uses a sacrificial resin to prepare a surface that is not only precisely parallel to a second substrate or surface, but also tangential to it at the same time. This method is easily illustrated as a method useful in 3D printing, see FIG. 4.

Figure 4:
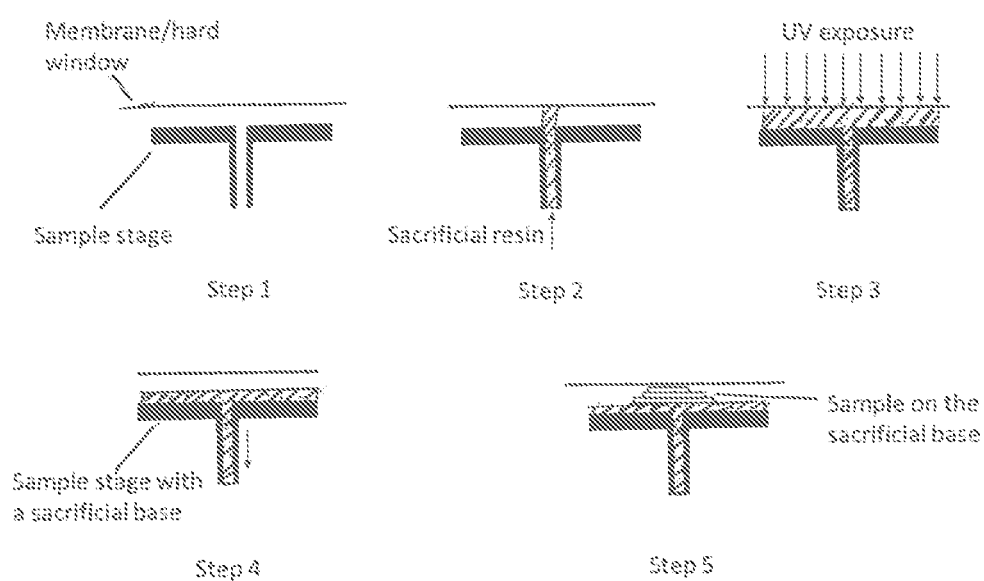
FIG. 4 shows steps in creating a sacrificial base to control the dimension of a 3D printed sample.

As shown in FIG. 4, before printing, sacrificial resin is delivered, e.g., from a center channel of the sample stage, to fully fill the gap between the membrane/hard window and the sample stage. The resin in the gap is polymerized using UV light in the case of photo reactive sacrificial resins or the heat in case of thermal curable sacrificial resins, to provide a sample stage with a base of sacrificial polymer ready for 3D printing. Due to the way it is prepared, the base will be perfectly parallel to the membrane/hard window, and at an accurately known distance. The adhesion between the sacrificial base and membrane/hard window should be controlled for good separation of the base from the membrane/hard window, for example, controlling the crosslinking density. The sample will be printed from the interface of the sacrificial base and the membrane/hard window. The printing apparatus can be arranged so that as the whole sample is printed, it will be submerged into an etching solution, which will remove the sacrificial base and release the sample.

The type of etching solution depends on the sacrificial resin. In one example, a resin comprising a mixture of N,N-Dimethylacrylamide(CAS: 2680-03-7) and 1%-3% by weight of Irgacure 819 (CAS 162881-26-7) photo-initiator was used as the sacrificial resin. Upon cure, the photo-crosslinked polymer can be dissolved in water or acid (PH value $\geq 4$) buffer solutions with 100-300 um/hour etching rate. Polyethylene glycol (MW<600) or water can also be added to the photo sensitive resin to increase the porosity of the polymer, which in turn increases the etch rate.

What is claimed is:
1. A method for positioning a first surface of a first substrate relative to a second surface of a second substrate, wherein the second substrate is a transparent membrane, the method comprising:

positioning the first substrate and a system comprising a lens having an optical axis, a charge-coupled device (CCD) capable of performing or assisting in performing an auto focusing program, and exactly one displacement sensor having an emission vector, in a manner such that the lens is situated between the first surface and the CCD, the optical axis of the lens intersects the first surface, the emission vector is parallel to the optical axis, and the CCD is focusable through the lens along the optical axis, sequentially aligning each point of a first set of three non-linear points on the first surface with the emission vector by moving the first substrate perpendicular to the optical axis, measuring a distance between the displacement sensor and the first surface at each point of the first set of non-linear points, adjusting the first substrate so that the distances between the displacement sensor and each point of the first set of three non-linear points are equal to establish a level first surface, placing the second substrate between the first substrate and the displacement sensor, sequentially aligning each point of a second set of three non-linear points on the second surface with the emission vector by moving the second substrate perpendicular to the optical axis, measuring a distance between the displacement sensor and the second surface at each point of the second set of non-linear points, adjusting the second substrate so that the distances between the displacement sensor and each point of the second set of three non-linear points are equal to establish the second surface parallel with the level first surface.

2. The method according to claim 1 further comprising:
performing an auto focusing program using the CCD so that the level first surface is at a focus plane of the lens followed by measuring a position of the first surface with the displacement sensor;

placing the second substrate between the lens and the first substrate so that the second surface is intersected by the optical axis of the lens and positioning the second substrate so that the second surface is at a selected distance from the level first surface as measured by the displacement sensor.

3. The method according to claim 1 wherein the CCD is a laser CCD.

4. The method according to claim 3 wherein the laser CCD is a laser CCD camera.

5. The method according to claim 1 wherein the lens is a projection lens.

6. The method according to claim 1 wherein the displacement sensor is a laser displacement sensor.

7. The method according to claim 1 wherein the displacement sensor is accurate to within 10 microns or less.

8. The method according to according to claim 1 wherein the first substrate is a sample stage for a stereolithography system.

9. The method according to claim 8 wherein the sample stage and the second substrate are positioned in a resin tank and the method further comprises a step wherein after the first surface and the second surface are positioned relative to each other the resin tank is filled with a curable resin up to the second substrate.

10. The method according to claim 9 wherein a distance between the first substrate and the second substrate is equal to a thickness of a first layer of a stereolithography process.

* * * * *